(12) United States Patent
Tomita

(10) Patent No.: US 7,696,641 B2
(45) Date of Patent: Apr. 13, 2010

(54) POWER SUPPLY CONTROL CIRCUIT AND ELECTRONIC CIRCUIT

(75) Inventor: Hiroto Tomita, Fukuoka (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 11/883,546

(22) PCT Filed: Feb. 13, 2006

(86) PCT No.: PCT/JP2006/302903

§ 371 (c)(1),
(2), (4) Date: Aug. 2, 2007

(87) PCT Pub. No.: WO2006/088167

PCT Pub. Date: Aug. 24, 2006

(65) Prior Publication Data

US 2008/0197703 A1     Aug. 21, 2008

(30) Foreign Application Priority Data

Feb. 16, 2005   (JP) .............................. 2005-039275

(51) Int. Cl.
*H02J 1/00* (2006.01)
*H01H 9/54* (2006.01)
(52) U.S. Cl. ..................... 307/31; 370/39; 370/126; 370/130; 370/131; 370/139
(58) Field of Classification Search ................ 307/31, 307/34, 39, 126, 130, 131, 139, 141.4, 143
See application file for complete search history.

(56) References Cited

U.S. PATENT DOCUMENTS

| | | | |
|---|---|---|---|
| 5,585,745 A | 12/1996 | Simmons et al. | |
| 5,752,050 A | 5/1998 | Hernandez et al. | |
| 6,088,806 A | 7/2000 | Chee | |
| 6,639,454 B2 * | 10/2003 | Hoshi et al. | 327/544 |
| 6,986,074 B2 * | 1/2006 | Alia et al. | 713/601 |
| 2002/0184547 A1 * | 12/2002 | Francis et al. | 713/322 |
| 2004/0123172 A1 | 6/2004 | Sheller | |

FOREIGN PATENT DOCUMENTS

| | | |
|---|---|---|
| JP | 0 582 391 | 2/1994 |
| JP | 7-141074 | 6/1995 |
| JP | 2002-341976 | 11/2002 |
| WO | 2004/012067 | 2/2004 |

* cited by examiner

*Primary Examiner*—Jared J Fureman
*Assistant Examiner*—Hal I Kaplan
(74) *Attorney, Agent, or Firm*—Wenderoth, Lind & Ponack, L.L.P.

(57) ABSTRACT

A power supply control circuit (3) having control of the supply and shutoff of electrical power from a power source (2), and including a request-receiving unit (11) operable to receive a power shutoff-requesting signal (10) from each of a plurality of functional blocks, in which each of the plurality of functional blocks has a predetermined processing function, a switchover unit (12) operable to provide switchover between the supply and shutoff of the electrical power from the power source to each of the plurality of functional blocks, and a control unit (13) operable to control the switchover unit (12) in accordance with the power shutoff-requesting signal (10) received by the request-receiving unit (11). The power supply control circuit (3) provides proper control over the supply and shutoff of the electrical power for each of the functional blocks, whereby each of the functional blocks consumes reduced electrical power.

17 Claims, 15 Drawing Sheets

Fig. 5

| | processor unit | image codec unit | image input unit | image output unit | DMA controller | memory controller |
|---|---|---|---|---|---|---|
| processor unit | — | o | o | o | o | o |
| image codec unit | o | — | 1 | 1 | o | o |
| image input unit | o | 1 | — | 1 | o | o |
| image output unit | o | 1 | 1 | — | o | o |
| DMA controller | o | o | o | o | — | o |
| memory controller | o | o | o | o | o | — |

Fig. 7

| | processor unit | image codec unit | image input unit | image output unit | DMA controller | memory controller |
|---|---|---|---|---|---|---|
| processor unit | — | o | o | o | o | o |
| image codec unit | o | — | o | o | o | o |
| image input unit | o | o | — | — | o | o |
| image output unit | o | o | — | — | o | o |
| DMA controller | o | o | o | o | — | o |
| memory controller | o | o | o | o | o | — | first matrix

Fig. 8

| | processor unit | image coded unit | image input unit | image output unit | DMA controller | memory controller |
|---|---|---|---|---|---|---|
| processor unit | — | o | o | o | o | o |
| image codec unit | o | — | 1 | 1 | o | o |
| image input unit | o | 1 | — | 1 | o | o |
| image output unit | o | 1 | 1 | — | o | o |
| DMA controller | o | o | o | o | — | o |
| memory controller | o | o | o | o | o | — | second matrix

POWER SUPPLY CONTROL CIRCUIT AND ELECTRONIC CIRCUIT

TECHNICAL FIELD

The present invention relates to a power supply control circuit operative to provide reduced power consumption, and an electronic circuit.

BACKGROUND ART

In recent electronic devices, a high-featured electronic circuit is often built therein which includes a large number of functional blocks, such as a processor, a DSP (digital signal processor), and dedicated hardware, each of which has a particular processing function. The electronic circuit including the large number of functional blocks is integrated into a semiconductor integrated circuit such as an IC or an LSI in order to meet the requirement for downsized electronic devices. With the integration of the electronic circuit into the semiconductor integrated circuit, super-fine processes such as 90-nm and 65-nm rules are now applied to the semiconductor integrated circuit.

However, super-fine processes involve large leakage current from each transistor unit, and result in increased leakage current from the semiconductor integrated circuit when the semiconductor integrated circuit is both deactivated and operated. In addition, the highly integrated semiconductor integrated circuit brings about a large total leakage current.

Accordingly, the leakage current must be reduced to provide reduced power consumption in an electronic device having the semiconductor integrated circuits incorporated therein.

In particular, with battery-driven handheld terminals, the increased leakage current results in a decreased period of time for which the handheld terminals are operable, and therefore a reduction in the leakage current is important.

In a typical electronic device, the electronic circuit and semiconductor integrated circuit disposed therein are supplied with electrical power together with the power source of the electronic device. The electrical power continues to be supplied to the electronic circuit and semiconductor integrated circuit, even when these circuits need not be operated. This causes a problem in which unwanted electrical power is consumed, regardless of an actual quantity of operation.

To avoid the problem, an art operable to provide a controlled supply of electrical power has been proposed.

According to an art disclosed by cited Reference No. 1 (published Japanese Patent Application Laid-Open No. (HEI) 7-141074), an external control interrupts the supply of power to functional blocks mounted in a semiconductor integrated circuit, in which each of the functional blocks has a particular processing function.

FIG. 16 is a block diagram illustrating an electronic circuit as disclosed by cited Reference No. 1.

The electronic circuit 700 includes a first functional block "703a" through an eighth functional block "703h", each of which has a particular processing function. Each of the first through eighth functional blocks "703a"-"703h" is a block having a different specific processing function such as image processing, voice processing, and memory access. A power supply control unit 701 has control of the supply and shutoff of power to the first through eighth functional blocks "703a"-"703h". A power control register 702 is operable to store externally written data on power control. The power supply control unit 701 is operable to control the supply and shutoff of power to the first through eighth functional blocks "703a"-"703h" in accordance with the power control data stored in the power control register 702.

The power control data is written to the power control register 702 through an exterior processor. This system allows external settings to control the supply of power to each of the plurality of functional blocks.

According to an art disclosed by cited Reference No. 2 (published Japanese Patent Application Laid-Open No. 2002-341976), the power supply is controlled in accordance with a stop mode signal from a processor built in a semiconductor integrated circuit.

FIG. 17 is a block diagram illustrating a system LSI as disclosed in cited Reference No. 2.

The system LSI 800 includes a CPU 803, a circuit "A" 804, and a circuit "B" 805. The CPU 803 sends out the stop mode signal to a control circuit 807 when each of the circuit "A" 804 and the circuit "B" completes a course of action. The control circuit 807 stores an externally outgoing signal in a backup register 808 upon receipt of the stop mode signal, and then sends out a shutoff-requesting signal to a power source 801. The power source 801 receives the shutoff-requesting signal and interrupts the supply of the power to the system LSI 800.

According to the power supply control as just discussed above, the termination of a course of action provided by each functional block integrated in a semiconductor integrated circuit is detected, whereby the controlled supply of power to each of the functional blocks is attainable.

However, a problem with the prior art power supply control is that heavy loads are imposed on the monitoring and processing required of the power supply control. In addition, the power supply control cannot be practiced within fine limits.

SUMMARY OF THE INVENTION

In view of the above, an object of the present invention is to provide a power supply control circuit operable to provide reduced loads on power supply control-related processing, and operable to provide proper control over the power supply for each of a plurality of functional blocks, whereby each of the functional blocks consumes less electrical power.

A first aspect of the present invention provides a power supply control circuit having control of the supply and shutoff of electrical power from a power source, including a request-receiving unit operable to receive a power shutoff-requesting signal from each of a plurality of functional blocks, in which each of the plurality of functional blocks has a predetermined processing function, a switchover unit operable to provide switchover between the supply and shutoff of electrical power from the power source to each of the plurality of functional blocks, and a control unit operable to control the switchover unit in accordance with the power shutoff-requesting signal received by the request-receiving unit.

The above structure interrupts the supply of power to each deactivated one of the functional blocks, and provides reduced power consumption by each of the deactivated functional blocks. The above structure shuts off the power supply in response to a request from each of the functional blocks, thereby providing reduced loads on processing such as external settings, and the above structure has control of the power shutoff for each of the functional blocks.

A second aspect of the present invention provides a power supply control circuit in which the power shutoff-requesting signal is a processing end signal sent out by at least one of the plurality of functional blocks.

The above structure facilitates detecting the times at which the electrical power need not be provided to each of the functional blocks, and provides control over the power shutoff for each of the functional blocks in accordance with a request directly made by each corresponding one of the functional blocks.

A third aspect of the present invention provides a power supply control circuit in which the power shutoff-requesting signal is a notification signal sent out at definite time intervals by at least one of the plurality of functional blocks.

The above structure allows the power shutoff-requesting signal to be easily generated by a simple system. As a result, the power shutoff is controlled for each of the functional blocks in accordance with a request directly made by each corresponding one of the functional blocks.

A fourth aspect of the present invention provides a power supply control circuit in which the power shutoff-requesting signal contains information on a period of time that elapses from the shutoff of the electrical power until the supply of the electrical power.

The above structure facilitates resuming the power supply after the power shutoff. In addition, the signal sent out by each of the functional blocks contains information on a period of time that elapses until the resumption of the power supply, and the power supply can be resumed without the need for external settings.

A fifth aspect of the present invention provides a power supply control circuit in which the control unit includes a power shutoff-permitting unit operable to permit the start and end of the shutoff of the electrical power in accordance with the power shutoff-requesting signal received by the request-receiving unit.

A sixth aspect of the present invention provides a power supply control circuit in which the power shutoff-permitting unit permits the start of the shutoff of the electrical power in accordance with the power shutoff-requesting signal from one of the plurality of functional blocks as well as another power shutoff-requesting signal from a further one of the plurality of functional blocks, in which the further one of the plurality of functional blocks has a processing dependent relationship with the one of the functional blocks.

A seventh aspect of the present invention provides a power supply control circuit in which, when the request-receiving unit receives one power shutoff-requesting signal from one of the plurality of functional blocks, the power shutoff-permitting unit permits the start and end of the shutoff of the electrical power, depending upon whether there is another power shutoff-requesting signal sent out by a further one of the plurality of functional blocks, in which the further one of the functional blocks has a processing dependent relationship with the one of the functional blocks.

According to each of the above structures, even when the power shutoff-requesting request is made by either one of the functional blocks that have a processing dependent relationship (such as signal exchange) with each other, a determination is made as to whether the power shutoff is permissible, in consideration of a status of another one of the functional blocks, which shares the processing dependent relationship with the either one of the functional blocks as just discussed above. As a result, the supply of the power to any one of the functional blocks is interrupted such that another functional block having the processing dependent relationship with the former functional block is prevented from malfunctioning.

An eighth aspect of the present invention provides a power supply control circuit in which the power shutoff-permitting unit permits the start of the shutoff of the electrical power when the request-receiving unit receives power shutoff-requesting signals from all of a subset of the plurality of functional blocks, in which the subset of the plurality of functional blocks shares a processing dependent relationship with each other.

The above structure prevents the malfunction of each of the functional blocks that share the processing dependent relationship with each other, or otherwise the malfunction would occur as a result of an interruption in the supply of power to each of the functional blocks. The malfunction-proof functional blocks consume reduced electrical power.

A ninth aspect of the present invention provides a power supply control circuit in which the power shutoff-permitting unit includes an information-storing unit operable to store information on a processing dependent relationship.

A tenth aspect of the present invention provides a power supply control circuit in which the information-storing unit is rewritable in accordance with an external factor.

Each of the above structures can set up a processing dependent relationship shared by the plurality of functional blocks, when necessary.

An eleventh aspect of the present invention provides a power supply control circuit in which the power shutoff-permitting unit includes a shutoff time-measuring unit operable to measure a certain period of time that elapses after the receipt of the power shutoff-requesting signal, whereby the power shutoff-permitting unit permits the start of the shutoff of the electrical power after the certain period of time elapses.

The above structure ensures that a certain margin time elapses before actual power shutoff from the moment when the power supply control circuit receives the power shutoff-requesting signal, and prevents the malfunction of each of the functional blocks which otherwise would occur as a result of changes in voltage upon power shutoff.

A twelfth aspect of the present invention provides a power supply control circuit in which the power shutoff-permitting unit includes a resumption time-measuring unit operable to measure a certain period of time that elapses after the start of the shutoff of the electrical power, whereby the power shutoff-permitting unit permits the end of the shutoff of the electrical power after the certain period of time elapses.

The above structure facilitates resuming the power supply after the power shutoff, and facilitates discerning the timing at which the power supply resumes.

A thirteenth aspect of the present invention provides an electronic circuit including a plurality of functional blocks, each of which has a predetermined processing function, a request-receiving unit operable to receive a power shutoff-requesting signal from each of the plurality of functional blocks, a switchover unit operable to provide switchover between the supply and shutoff of electrical power from a power source to each of the plurality of functional blocks, and a control unit operable to control the switchover unit in accordance with the power shutoff-requesting signal received by the request-receiving unit.

A fourteenth aspect of the present invention provides an electronic circuit in which the control unit includes a power shutoff-permitting unit operable to permit the start and end of the shutoff of the electrical power in accordance with the power shutoff-requesting signal received by the request-receiving unit.

Each of the above structures prevents the malfunction of each of the functional blocks, and provides proper control over the power supply in accordance with a request directly made by each of the functional blocks, whereby the electronic circuit consumes reduced electrical power.

A fifteenth aspect of the present invention provides an electronic circuit, further including an output value-fixing unit operable to fix a logical value of an output signal from each of the plurality of functional blocks, in which the output value-fixing unit provides a fixed logical value of an output signal from each one of the plurality of functional blocks when the each one of the plurality of functional blocks is interrupted from the supply of the electrical power.

The above structure prevents the malfunction of each of the functional blocks from which a signal is sent out. Otherwise, a malfunction would occur because an output value of each of the functional blocks varies with changes in voltage upon the power shutoff.

A sixteenth aspect of the present invention provides an electronic circuit in which an electronic element included in the output value-fixing unit has a lower operating voltage than an electronic element included in the each one of the plurality of functional blocks.

The above structure allows the output value-fixing unit to consume less electrical power. In particular, the above structure exercises great effects on a reduction in power consumption of the output value-fixing unit when an increased number of output signals results in larger-scale circuits.

A seventeenth aspect of the present invention provides an electronic circuit in which an electronic element included in the output value-fixing unit has a lower threshold voltage than an electronic element included in the each one of the plurality of functional blocks.

The above structure allows the output value-fixing unit to consume less electrical power. In particular, the above structure exercises great effects on a reduction in power consumption of the output value-fixing unit when an increased number of output signals results in larger-scale circuits.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is an illustration showing a processing dependent relationship shared by functional blocks according to the second embodiment;

FIG. 7 is a descriptive illustration showing one piece of the processing dependent relationship information according to the second embodiment;

FIG. 8 is a descriptive illustration showing another piece of the processing dependent relationship information according to the second embodiment;

DETAILED DESCRIPTION OF THE INVENTION

Embodiments of the present invention are now described with reference to the accompanying drawings.

First Embodiment

A first embodiment is described with reference to FIGS. 1-3.

Figure 1:
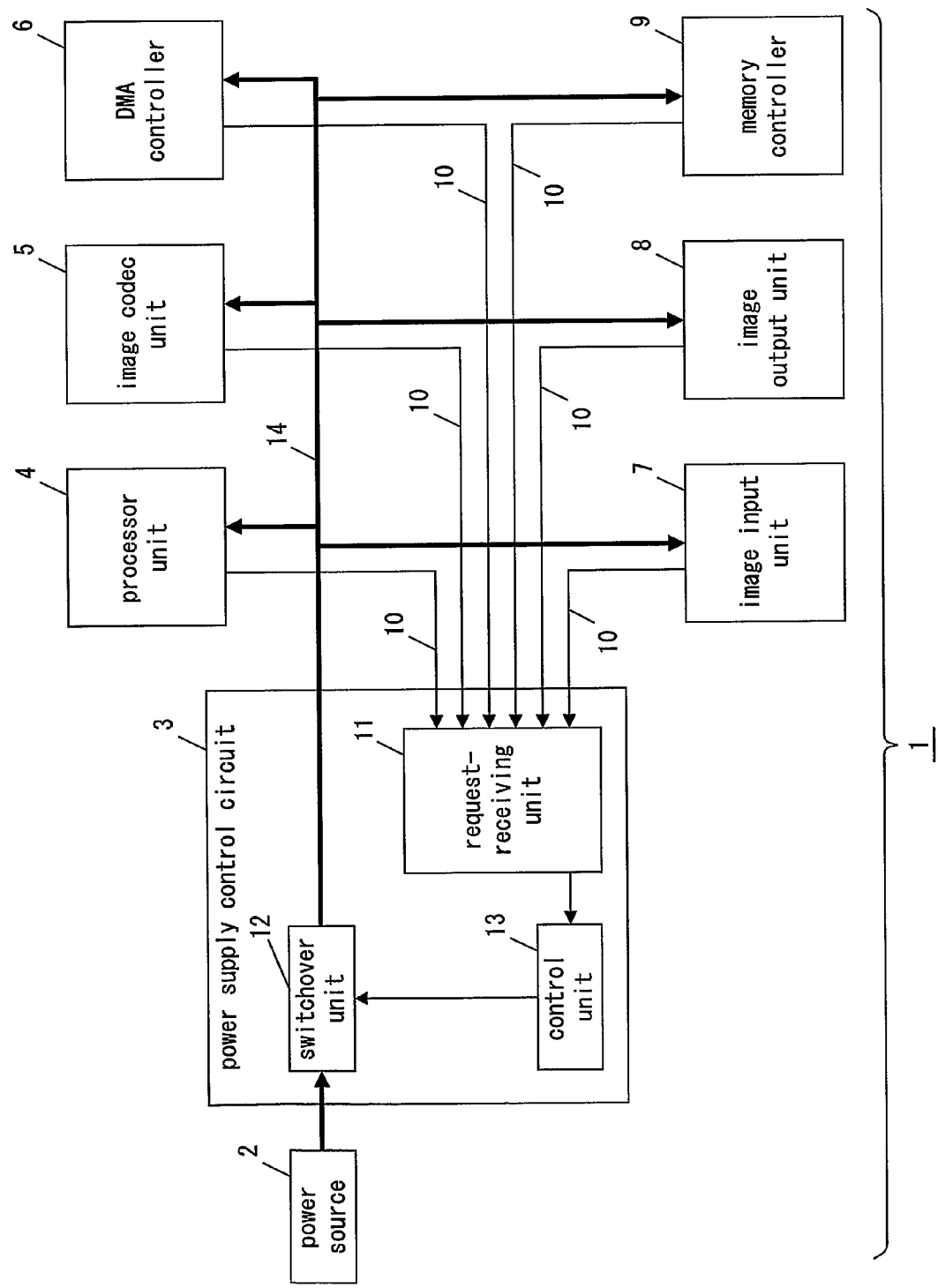
FIG. 1 is a block diagram illustrating an electronic circuit according to a first embodiment of the present invention.

FIG. 1 is a block diagram illustrating an electronic circuit according the present embodiment, in which the entire electronic circuit including a power supply control circuit is illustrated.

The present embodiment exemplifies, as each functional block having a predetermined processing function, a processor unit 4, an image codec unit 5, a direct memory access controller (hereinafter called a "DMA controller") 6, an image input unit 7, and image output unit 8, and a memory controller 9.

The electronic circuit 1 may be either made up of discrete electronic elements or integrated into a semiconductor integrated circuit. The power supply control circuit 3 may be either formed separately from or combined integrally with any one of the functional blocks, such as the image codec unit 5. The power supply control circuit 3 may be integrated into the semiconductor integrated circuit having the functional blocks incorporated therein, whereby a great effect on a reduction in leakage current is exercised.

The following discusses details of each element of the electronic circuit 1.

A power source 2 is initially described.

The power source 2 is an electrical power-supplying source, and supplies electrical power, through a power channel 14, to the electronic circuit 1 including the functional blocks. The power source 2 may be an AC source, or otherwise a battery.

The functional blocks are now described.

Each of the functional blocks is a unit of the circuit, which has a predetermined processing function (including a required program). In FIG. 1, the processor unit 4, image codec unit 5, DMA controller 6, image input unit 7, image output unit 8, and memory controller 9 are exemplified as the functional blocks. Although the processor unit 4, the image codec unit 5, and the others are illustrated in FIG. 1 as exemplary functional blocks having predetermined processing functions, other functional blocks may be provided.

The processor unit 4 is a programmably operated processor such as a CPU and a DSP, and is operable to both control and synchronize the other functional blocks. In response to externally provided program control, the processor unit 4 has control of the entire electronic circuit 1.

The image codec unit 5 is operable to both encode images and decode encoded images, based on incoming image data. For example, the image codec unit 5 encodes and decodes images in accordance with any standard such as MPEG and JPEG. The image data used by the image codec unit 5 to encode the images is image data entered into the electronic circuit 1 through the image input unit 7. The image codec unit 5 encodes the image data, thereby providing encoded data, which is then stored in a memory (not shown). The stored encoded data is decoded by the image codec unit 5. The decoded image data are displayed on a display unit (not shown), such as either a liquid crystal screen or a CRT through the image output unit 8.

A voice codec unit (not shown) other than the image codec unit 5 may be provided. The image codec unit 5 is a functional block rendered inoperative except for during the image encoding and decoding.

The DMA controller 6 is operable to transfer the data between the other functional blocks such as between the memory (not shown) and the image codec unit 5 without using the processor unit 4. The data transfer without using the processor unit 4 eliminates the need for control over both a load signal and a store signal, and high-speed data transfer is achievable. For example, the DMA controller 6 is used to transfer the image data from the memory (not shown) to the image codec unit 5 at high speed. The DMA controller 6 is a functional block rendered inoperative except for during the data transfer.

The image input unit 7 is a functional block operable to receive the image data through an exterior camera. Assuming that the electronic circuit 1 is incorporated in a portable terminal, the image input unit 7 brings the image data captured by the built-in camera into the electronic circuit 1 in accordance with any format, utilizing for example YCbCr (luminance and chroma) components or RGB (red-green-blue) components.

The image data is stored in the memory (not shown) in order to be encoded by the image codec unit 5. Alternatively, the image data taken in by the image input unit 7 is transmitted directly to the image output unit 8, and is thereby displayed on the display unit (not shown) through image output unit 8.

The image input unit 7 is a functional block rendered inoperative except for during the image capture.

The image output unit 8 is operable to feed either the decoded image data from the image codec unit 5 or the received image data from the image input unit 7 into the display unit (not shown). The image output unit 8 is further operable to convert the image data in accordance with a format consistent with the specification of the display unit (not shown).

The image output unit 8 is a functional block rendered inoperative except for during the output of the image data to the display unit (not shown).

The image input and output units 7, 8 may handle the input and output of voices and data, as well as images.

The memory controller 9 is operable to store the data in the memory (not shown) or to read the data therefrom. For example, the memory controller 9 provides both control such as to store the captured image data from the image input unit 7 into the memory (not shown), and control such as to transfer the decoded image data from the memory (not shown) to the image output unit 8. The memory controller 9 provides control in accordance with a type of each memory to be used. When the memory (not shown) is a synchronous DRAM, the memory controller 9 generates and outputs required sequence and control signals. When the memory (not shown) is a SRAM, the memory controller 9 generates and outputs a clock synchronization signal.

The memory controller 9 is a functional block rendered inoperative except for during the access to the memory (not shown).

As described above, the plurality of functional blocks can be rendered both operative and inoperative.

The following discusses the power supply control circuit 3.

The power supply control circuit 3 includes a request-receiving unit 11, a switchover unit 12, and a control unit 13.

The request-receiving unit 11 is operable to receive a power shutoff-requesting signal 10 from each of the functional blocks.

The power shutoff-requesting signal 10 is a signal sent out voluntarily by each of the functional blocks such as the image codec unit 5 and the DMA controller 6. The power supply control circuit 3 has control of the supply and shutoff of power to each of the functional blocks in accordance with the power shutoff-requesting signal 10 from each of the functional blocks.

The power shutoff-requesting signal 10 may be a variety of signals. In particular, a processing end signal sent out from each of the functional blocks to the processor unit 4 is desirably used because processing provided by each functional block must be terminated in order that the functional block may make a request for power shutoff. Alternatively, to allow the plurality of functional blocks to provide synchronized processing, each of the functional blocks sends out, to the processor unit 4, a notification signal that notifies the processor unit 4 of the start and end of the processing conducted by the functional block; the notification signal addressed to the processor unit 4 is also desirably used as the power shutoff-requesting signal 10 because the power supply may be stopped after the termination of the processing provided by each of the functional blocks. The processing end signal is fed out of each of the functional blocks as the notification signal addressed to the processor unit 4, and no further signal need be fed out of the functional blocks. Accordingly, the processing end signal from each of the functional blocks is desirably used as the power shutoff-requesting signal 10.

The processor unit 4 may be set not to output the power shutoff-requesting signal 10 when each corresponding one of the other functional blocks is switched back to an operative mode from an inoperative mode.

Figure 2:
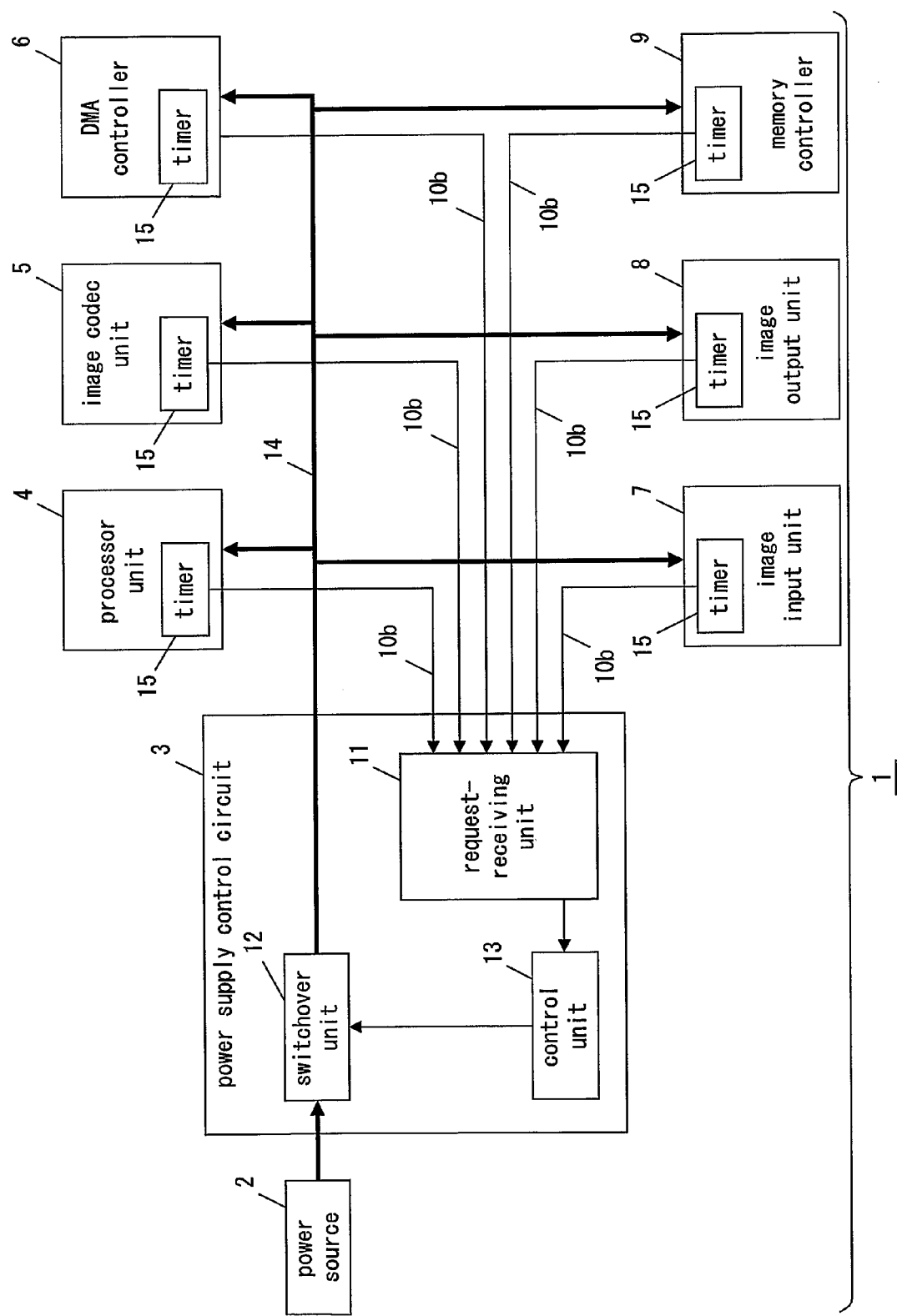
FIG. 2 is a block diagram illustrating another electronic circuit according to the first embodiment.

As a further alternative, as illustrated in FIG. 2, a notification signal "10*b*" fed out of each of the functional blocks at definite time intervals into the request-receiving unit 11 may be used. FIG. 2 is a block diagram illustrating another electronic circuit according to the present embodiment. Each of the functional blocks is provided with a timer 15 operable to measure a predetermined period of time, thereby feeding the notification signal "10*b*" into the request-receiving unit 11 at the predetermined period of time. For example, assuming that the electronic circuit 1 is designed to alternate the image input and the image output at definite time intervals, each of the image input unit 7, image output unit 8, and image codec unit 5 provides repeated switchover between the operative and inoperative modes at definite time intervals. Accordingly, the timer 15 for each of such functional blocks sends out the notification signal "10*b*" each time when each of the functional blocks as discussed above is switched over from the operative mode to the inoperative mode. The notification signal "10*b*" discerns that each of the functional blocks has assumed the inoperative mode from the operative mode. Thus, the notification signal "10*b*" sent out at definite time intervals is used as the power shutoff-requesting signal 10, thereby providing control over the supply and shutoff of power to the functional blocks.

The timer 15 for each of the functional blocks may generate the notification signal "10b" at time intervals that are determined in accordance with the specification of each of the functional blocks. The timer 15 need not be provided in the functional blocks that do not need to send out the power shutoff-requesting signal 10.

The switchover unit 12 provides switchover between the supply and shutoff of power to the functional blocks from the power source 2. The switchover is realized by, e.g., a switch. When the switch is connected, then the power source 2 is connected to the power channel 14, thereby supplying the electrical power to the functional blocks. Conversely, when the switch is disconnected, then the power source 2 is disconnected from the power channel 14, thereby interrupting the supply of the power to the functional blocks.

The switchover unit 12 includes switches corresponding in number to the functional blocks, and provides switchover between the power supply and the power shutoff for each of the functional blocks. Similarly, the power channel 14 is formed individually for each of the functional blocks, thereby providing switchover between the power supply and the power shutoff for each of the functional blocks.

The control unit 13 has control of the switchover provided by the switchover unit 12. The control unit 13 is operable to control the timing of the changeover between power supply and power shutoff in accordance with the power shutoff-requesting signal 10 received by the request-receiving unit 11, thereby issuing instructions to the switchover unit 12 to provide the switchover as discussed above. When the power shutoff-requesting signal 10 is active, one control signal indicative of starting power shutoff is sent out from the control unit 13 to the switchover unit 12. When the power shutoff-requesting signal 10 is non-active, another control signal indicative of terminating power shutoff is sent out from the control unit 13 to the switchover unit 12.

Alternatively, in view of proper timing, the control unit 13 desirably generates and feeds the control signal indicative of the start and end of the power shutoff into the switchover unit 12. For example, when a certain period of time elapses after the receipt of the power shutoff-requesting signal 10, then the control unit 13 may send out the control signal indicative of the power shutoff because taking a time margin into account makes it feasible to prevent malfunction in each of the functional blocks, which otherwise might occur during the transition from supply to shutoff of the power to each of the functional blocks, and vice versa.

The following discusses an example of the operation of the power supply control circuit 3. The discussion herein assumes that image data captured after the activation of the power source 2 are initially encoded and then decoded, thereby providing the decoded image data.

When the power source 2 is activated, the electronic circuit 1 is supplied with electrical power. In an initial setting, the switchover unit 12 supplies electrical power to all of the functional blocks, and all of the functional blocks are supplied with the electrical power. When electrical power is delivered throughout the electronic circuit 1, then each of the functional blocks are rendered operative.

When each of the functional blocks is rendered operative, then the processor unit 4 issues instructions to the image input unit 7 to take in image data through an exterior camera. While capturing the image data, the image input unit 7 sends out a data transfer-requesting signal to the DMA controller 6 at definite time intervals. The DMA controller 6 in receipt of the data transfer-requesting signal transfers the captured image data to the memory (not shown). The transferred image data is stored in the memory (not shown) for each certain amount of the image data. When completing the capture of an image corresponding to a single image screen, the image input unit 7 sends out a processing end signal to the processor unit 4 at the same time as the power shutoff-requesting signal 10 to the request-receiving unit 11.

In response to the power shutoff-requesting signal 10 from the image input unit 7, the control unit 13 sends out a control signal to the switchover unit 12 for interrupting the supply of power to the image input unit 7. The switchover unit 12 interrupts the supply of power to the image input unit 7 in accordance with the control signal from the control unit 13. As a result, the power to the image input unit 7 is shut off. The power shutoff eliminates the occurrence of leakage current from the image input unit 7, and provides reduced power consumption in the image input unit 7 during the inoperative time of the image input unit 7.

The processor unit 4 in receipt of the processing end signal sent from the image input unit 7 instructs the image codec unit 5 in a controlled manner in order to encode the image data. The image codec unit 5 after receiving the instructions sends out a transfer-requesting signal to the DMA controller 6, thereby importing the image data therefrom in a certain amount. The certain amount of the transfer-requested image data may be, e.g., an amount of 16-pixel-by-16-pixel data referred to as a macro block. The image codec unit 5 encodes the imported image data in accordance with any standard such as MPEG and JPEG, thereby providing bitstream data.

The image codec unit 5 sends out a transfer-requesting signal to the DMA controller 6, thereby transferring the encoded image data to the memory (not shown). When completing both of the encoding of the image data that corresponds to a single image screen, as captured by the image input unit 7, and the transfer of the encoded image data to the memory (not shown), then the image codec unit 5 starts decoding the encoded image data as stored in the memory (not shown). When completing the decoding of the encoded image data, then the image codec unit 5 sends out a processing end signal to the processor unit 4. At the same time, the image codec unit 5 sends out the processing end signal as the power shutoff-requesting signal 10 to the request-receiving unit 11.

The control unit 13 sends out a control signal to the switchover unit 12, in response to the received power shutoff-requesting signal 10, for interrupting the supply of the power to the image codec unit 5. The switchover unit 12 interrupts the supply of the power to the image codec unit 5 in accordance with the control signal. As a result, excess power consumption in the image codec unit 5 rendered in an inoperative mode is reduced.

The processor unit 4 issues instructions to the image output unit 8 to feed the image into an exterior display unit (not shown). The image output unit 8 in receipt of the instructions sends out a transfer-requesting signal to the DMA controller 6 to transfer the decoded image data from the memory (not shown) to the image output unit 8. The DMA controller 6 transfers the decoded image data from the memory (not shown) to the image output unit 8. The image output unit 8 changes the image data in accordance with a format (e.g., RGB) suited for the exterior display unit (not shown), thereby providing the format-changed image data.

When completing the output of the decoded image data, the image output unit 8 sends out a processing end signal to the processor unit 4 at the same time as the power shutoff-requesting signal 10 to the request-receiving unit 11. Similar to the image codec unit 5, the power supply control circuit 3 interrupts the supply of power to the image output unit 8. As a result, the supply of power to the image output unit 8 rendered in an inoperative mode is interrupted without the occurrence of a leakage current, and reduced power consumption in the electronic circuit 1 is achievable.

Thereafter, the supply of power to the image input unit 7 is resumed to start taking in a new image, thereby restarting the image encoding and decoding.

As described above, in a series of steps in which the image input and output are alternated for each image screen, the supply of the electrical power to each of the functional blocks rendered in an inoperative mode is interrupted, thereby providing reduced power consumption in the electronic circuit 1.

When completing the access to the memory (not shown) is completed, the memory controller 9 sends out a processing end signal as the power shutoff-requesting signal 10 to the power supply control circuit 3, thereby interrupting the supply of power to the memory controller 9 in which is an inoperative mode.

To resume the power supply after supplying power, a signal indicative of operating instructions from the processor unit 4 may be used. Alternatively, as shown in FIG. 3, the power shutoff-requesting signal 10 preferably contains, in advance, information on the time that elapses until the power supply resumes, whereby the power supply is controlled.

Figure 3:
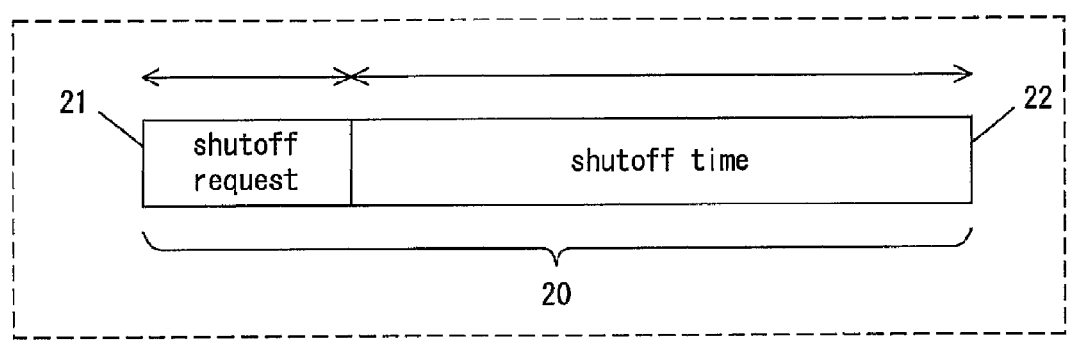
FIG. 3 is an illustration showing a stream of a power shutoff-requesting signal according to the first embodiment.

FIG. 3 is an illustration showing a stream of the power shutoff-requesting signal according to the present embodiment. The signal 20 made up of plural bits contains information on both a shutoff request 21 and a shutoff time 22. The control unit 13 sets up a power shutoff time in accordance with the shutoff time information, thereby sending out one control signal to the switchover 12 for power shutoff. The control unit 13 sends out another control signal to the switchover unit 12 for resuming power supply after the shutoff time elapses. As a result, such a simple construction provides control over the re-supply of power.

As described above, the supply and shutoff of power to each of the functional blocks are controllable in accordance with the power shutoff-requesting signal 10 sent out by each of the functional blocks. In addition, the processing end signal sent out by each of the functional blocks is used as the power shutoff-requesting signal 10, and there is no need for external shutoff settings, whereby the processing is carried out with lighter loads. Accordingly, the supply of power to each of the functional blocks which is in an inoperative mode is properly controlled within fine limits, and dramatically reduced power consumption in the electronic circuit 1 is realized. This feature is particularly advantageous in electronic circuits disposed in semiconductor integrated circuits in which leakage current is likely to become troublesome.

It is also desirable that an externally settable power supply control register provides external control over the power shutoff. The power supply control register is provided with a power shutoff-prohibiting setting for each of the functional blocks, whereby the power shutoff can be prohibited, regardless of the power shutoff-requesting signal 10 from each of the functional blocks. For example, assuming that the image input unit 7 consecutively takes in images at high speed, and that the image codec unit 5 consecutively encodes the images at high speed, the time required to resume the power supply after the power shutoff sometimes impedes the high-speed processing.

In this instance, the settings to prohibit the shutoff of the power to both of the image input unit 7 and the image codec unit 5 are written in advance to the power supply control register, and a power shutoff-free, high-speed course of action is realized. The consecutive and rapid encoding by the image codec unit 5 as just discussed above refers to either an increase in frame rate of image input into the image input unit 7 or an increase in frame rate of image output from the image output unit 8.

Second Embodiment

A second embodiment is now described.

The present embodiment describes a process in which a power supply control circuit 3 provides higher-featured power shutoff in accordance with a power shutoff-requesting signal 10 received thereby.

Figure 4:
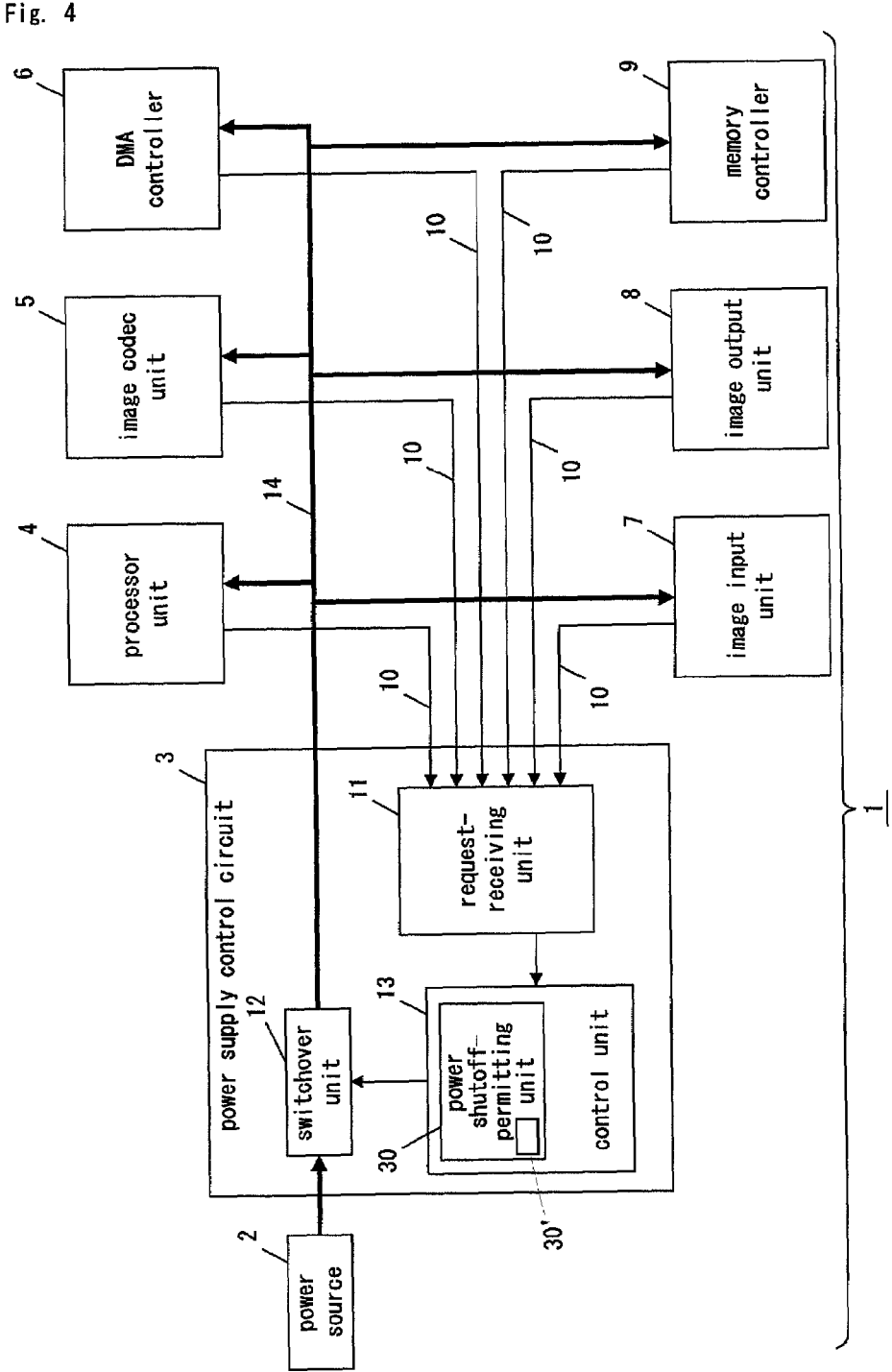
FIG. 4 is a block diagram illustrating an electronic circuit according to a second embodiment.

FIG. 4 is a block diagram illustrating an electronic circuit according to the present embodiment, in which an electronic circuit 1 including the power supply control circuit 3 is illustrated. The electronic circuit 1 may be integrated into either a singular semiconductor integrated circuit such as an IC and an LSI or plural semiconductor integrated circuits, or otherwise may be formed by discrete electronic elements. The power supply control circuit 3 may be either formed separately from other functional blocks or combined integrally therewith. The power supply control circuit 3 may be in either the semiconductor integrated circuit or the electronic elements. A power source 2 may be an AC source or otherwise a battery.

The power supply control circuit 3 of FIG. 4 is similar in construction to that according to the previous embodiment except for the presence of a power shutoff-permitting unit 30. The power shutoff-permitting unit 30 is operable to determine whether the shutoff of the power to each of the functional blocks is permissible.

For example, although a power shutoff-requesting signal 10 is sent out by one of the functional blocks, there are cases where the power shutoff should be avoided in light of a processing dependent relationship between that particular functional block and the other functional blocks. In view of such a situation, the power shutoff-permitting unit 30 determines whether the power shutoff is permissible. For example, even when sending out a power shutoff-requesting signal 10, the image codec unit 5 can stop neither encoding an image nor generating image data during the operation of the image input unit 7. Accordingly, the supply of power to the image codec unit 5 should be uninterrupted, regardless of the presence of the power shutoff-requesting signal 10 from the image codec unit 5. Thus, in consideration of each status of the functional blocks having a mutually processing dependent relationship with one another, the power shutoff-permitting unit 30 determines whether the power shutoff is permissible.

FIG. 5 is an illustration showing a processing dependent relationship shared by the functional blocks according to the present embodiment.

Referring to FIG. 5, a combination of two different functional blocks shares the illustrated value "1", showing that the two different functional blocks are in a mutually processing dependent relationship with one another. The power shutoff-permitting unit 30 does not permit power shutoff when receiving a power shutoff-requesting signal 10 from only either one of the combined two different functional blocks. For example, the image input unit 7 is set to have the processing dependent relationship with both of the image codec unit 5 and the image output unit 8. In consideration of the power shutoff-requesting signal 10 from each of the above functional blocks having a processing dependent relationship with each other, the power shutoff-permitting unit 30 determines whether power shutoff is permissible. In contrast, the image input unit 7 does not to have a processing dependent relationship with the processor unit 4, the DMA controller 6, and the memory controller 9. Accordingly, the power shutoff-permitting unit 30 determines, without regard to a status of each of the above functional blocks, that power shutoff is permissible.

Assuming that the image input unit 7 sends out the power shutoff-requesting signal 10, it is determined, in accordance with the mutually processing dependent relationship as discussed above, that the supply of power to the image input unit 7 should be uninterrupted when the power shutoff-requesting signal 10 is not sent from the image codec unit 5. The image codec unit 5 does not send out the power shutoff-requesting signal 10 because it is in operation, and because the image codec unit 5 cannot stop capturing image data required by the image codec unit 5. Similarly, the supply of a power to the image input unit 7 should be uninterrupted, regardless of the presence of the power shutoff-requesting signal 10 from the image input unit 7, because images to be displayed disappear when the image input unit 7 stops capturing the image data while the image output unit 8 has not sent out a power shutoff-requesting signal 10. The power shutoff-permitting unit 30 determines, in accordance with the processing dependent relationship among the plurality of functional blocks as discussed above, whether the power shutoff is permissible.

In contrast, with continued reference to FIG. 5, a combination of three different functional blocks shares the illustrated value "0", indicating that the three different functional blocks are not in a mutually processing dependent relationship with one another. Accordingly, when the power shutoff-requesting signal 10 is sent out by any one of the three different functional blocks, then the power shutoff-permitting unit 30 permits the power shutoff, regardless of whether the power shutoff-requesting signal 10 is sent out by the other functional blocks.

The following discusses, with reference to FIG. 9, a process in which the power shutoff-permitting unit 30 permits the power shutoff in accordance with a processing dependent relationship shared by the functional blocks. FIG. 9 is a descriptive illustration showing the way of determining whether power shutoff is permissible according to the present embodiment. The power shutoff-permitting unit 30 determines the start and end of the power shutoff in accordance with a combination of the power shutoff-requesting signals 10 from the image input unit 7, image codec unit 5, and image output unit 8.

Figure 9A:
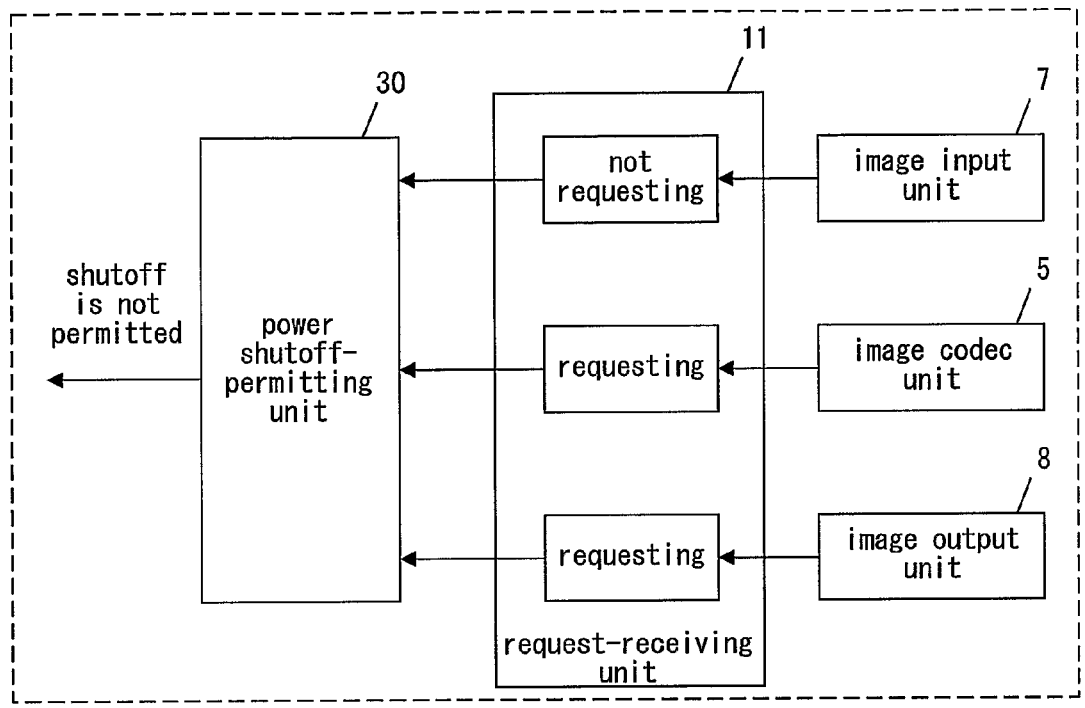
FIG. 9(a) is a descriptive illustration showing one pattern of determining whether the power shutoff is permissible according to the second embodiment.
Figure 9B:
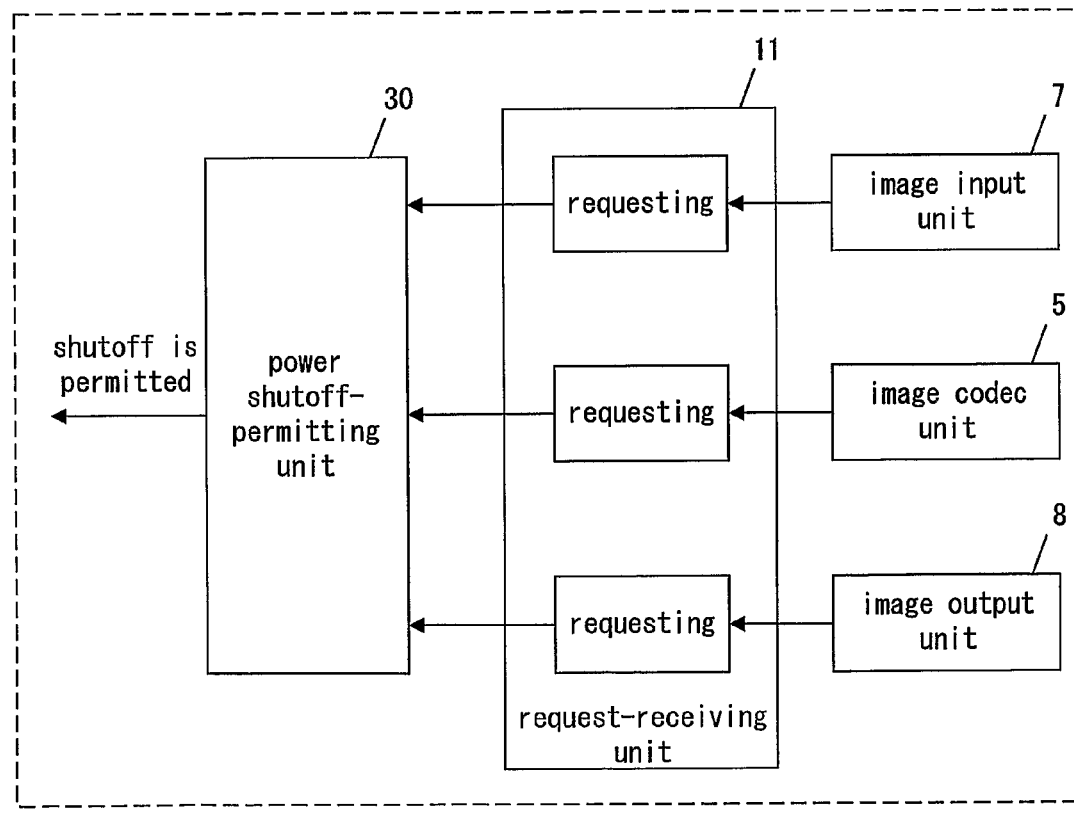
FIG. 9(b) is a descriptive illustration showing another pattern of determining whether the power shutoff is permissible according to the second embodiment.

FIG. 9(a) illustrates a process in which only the image input unit 7 does not request power shutoff, and each of the image codec unit 5 and the image output unit 8 requests power shutoff. As illustrated in FIG. 5, a mutually processing dependent relationship is shared by the image input unit 7, image codec unit 5, and image output unit 8. According to FIG. 9(a), the image input unit 7 having a mutually processing dependent relationship with the remainder does not request power shutoff, and the power shutoff-permitting unit 30 determines that the shutoff is impermissible. Turning now to FIG. 9(b), all of the image input unit 7, image codec unit 5, and image output unit 8 request a power shutoff, and a power shutoff-permitting unit 30 determines that the power shutoff is permissible. The result from each of the above determinations is fed into the switchover unit 12, and is then used to allow the switchover unit 12 to provide switchover control.

The processing dependent relationship of FIG. 5 is offered merely as an illustration. The processing dependent relationship may be stored in either a register or memory, both of which are referenced by the power shutoff-permitting unit 30. The processing dependent relationship is desirably rewritable a posteriori in accordance with a change in specification.

It is also desirable that the power shutoff-permitting unit 30 contains information on the processing dependent relationship in an information-storing unit 30'. The processing dependent relationship information may be changed in accordance with external factors so as to be used by the power shutoff-permitting unit 30. The processing dependent relationship information may be provided by either the matrix of FIG. 5 or a procedure table.

Figure 6:
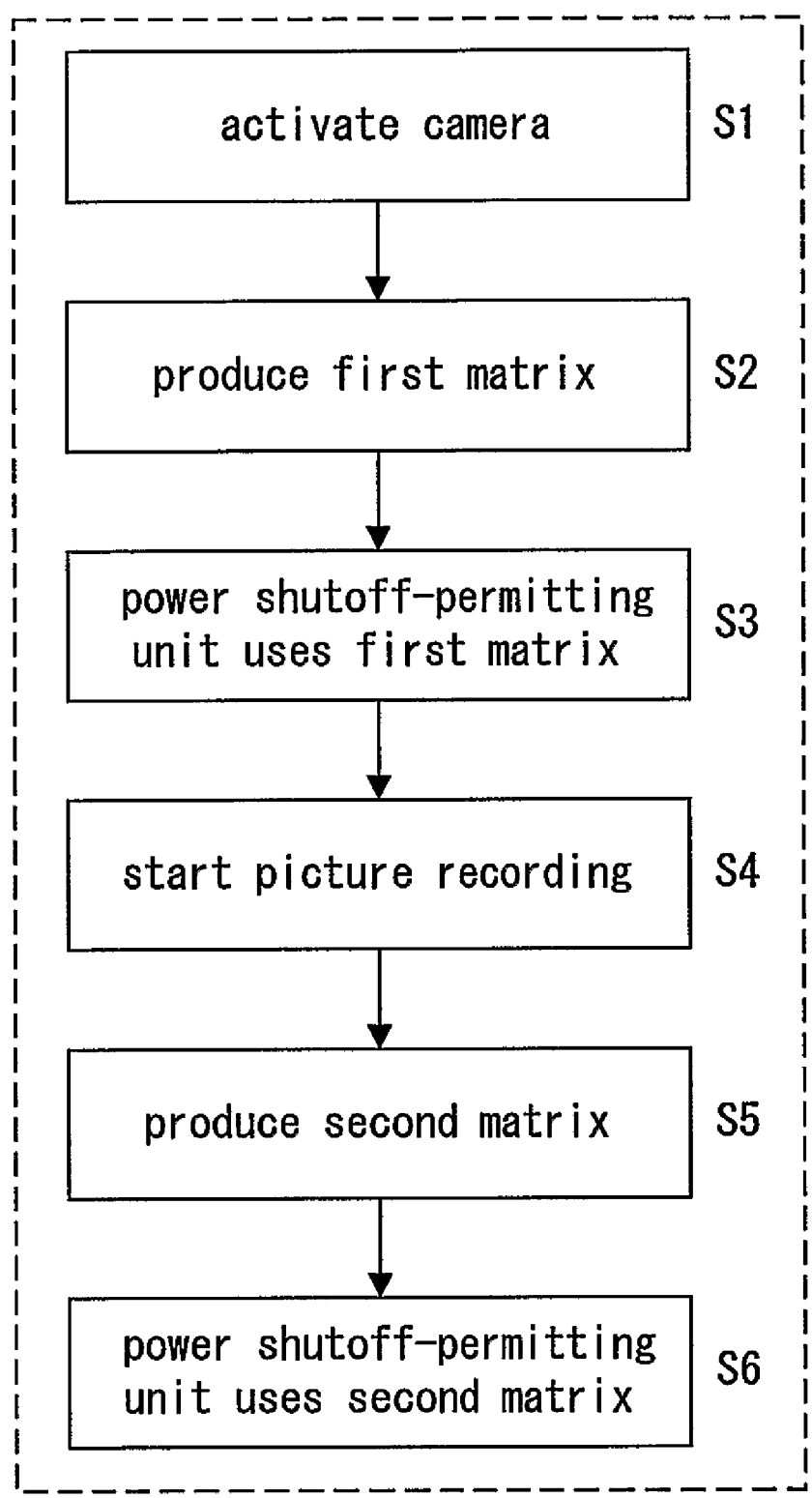
FIG. 6 is a flowchart illustrating a change in processing dependent relationship information according to the second embodiment.

The following discusses, with reference to FIGS. 6-8, a process in which the processing dependent relationship information is changed in dependence upon the external factors.

FIG. 6 is a flowchart illustrating a change in the processing dependent relationship information according to the present embodiment. Each of FIGS. 7 and 8 is a descriptive illustration showing processing dependent relationship information according to the present embodiment. The processing dependent relationship information of FIG. 7 and that of FIG. 8 are referred to as a first matrix and a second matrix, respectively. The electronic circuit 1 is disposed in an electronic device such as a digital camera or a video camera. The electronic device is one provided with a camera and a picture recording function. The processing dependent relationship information is changed depending upon external factors such as the camera and picture recording function incorporated in the electronic device.

At initial step S1, the camera in the electronic device including the electronic circuit 1 is activated. At this time, an activation switch on the camera is turned on. The power supply control circuit 3 is notified that the camera is now rendered operative. Alternatively, the power supply control circuit 3 is notified that the camera is rendered operative by activation switch-based software processing.

After the camera is activated, at step S2 the first matrix of FIG. 7 is produced as one piece of processing dependent relationship information. When the camera is operative, images taken in by the camera enter the camera, thereby displaying the incoming images on a display unit of the camera. This means that the image input unit 7 and the image output unit 8 are in consecutive operation. As evidenced by FIG. 7, according to the first matrix, the image input unit 7 and image output unit 8 are in a mutually dependent relationship with one another.

After the first matrix is produced, at step S3 the power shutoff-permitting unit 30 determines, in accordance with the first matrix used as the processing dependent relationship information, whether power shutoff is permissible.

While the matrix 1 is used as the processing dependent relationship information (or for a period of time in which only both of the camera and the display unit are in operation), the power shutoff-permitting unit 30 permits power shutoff only when both of the image input unit 7 and the image output unit 8 feed their respective power shutoff-requesting signals 10.

At step S4, picture recording is started. The power supply control circuit 3 is notified that, for example, a user presses a picture recording button on the camera, thereby entering the camera into a picture recording mode.

After the picture recording mode is started, at step S5 the second matrix is produced as another piece of processing dependent relationship information. In the picture recoding mode, images taken in by the camera enter the camera, thereby providing the codec with the incoming images. Eventually, the images are displayed on the display unit. This means that, in the picture recoding mode, the image input unit 7, image codec unit 5, and image output unit 8 are in operation. According to the second matrix, the image input unit 7 is in a processing dependent relationship with both of the image codec unit 5 and the image output unit 8.

After the second matrix is generated, at step S6 the power shutoff-permitting unit 30 determines, in accordance with the second matrix used as the processing dependent relationship information, whether power shutoff is permissible.

More specifically, the power shutoff-permitting unit 30 permits power shutoff only when all of the image input unit 7, image codec unit 5, and image output unit 8 feed their respective power shutoff-requesting signals 10.

Upon switchover to the picture recording mode, the image codec unit 5 assumes a processing dependent relationship with the image input unit 7, and the processing dependent relationship information used by the power shutoff-permitting unit 30 is changed in content, which means that the first matrix is switched over to the second matrix.

As described above, it is also preferred that the processing dependent relationship information referenced by the power shutoff-permitting unit 30 to perform the power shutoff is changed in accordance with the external factors. Such a change in processing dependent relationship information according to the external factors provides the power shutoff in accordance with the operation of the electronic device.

As described above, the control unit 13 includes the power shutoff-permitting unit 30 operable to permit a power shutoff after receiving all of the power shutoff-requesting signals 10 from the plurality of functional blocks having a mutually processing dependent relationship with each other. As a result, reduced power consumption in the electronic circuit 1 is achievable without allowing processing speed to be impeded.

Figure 10:
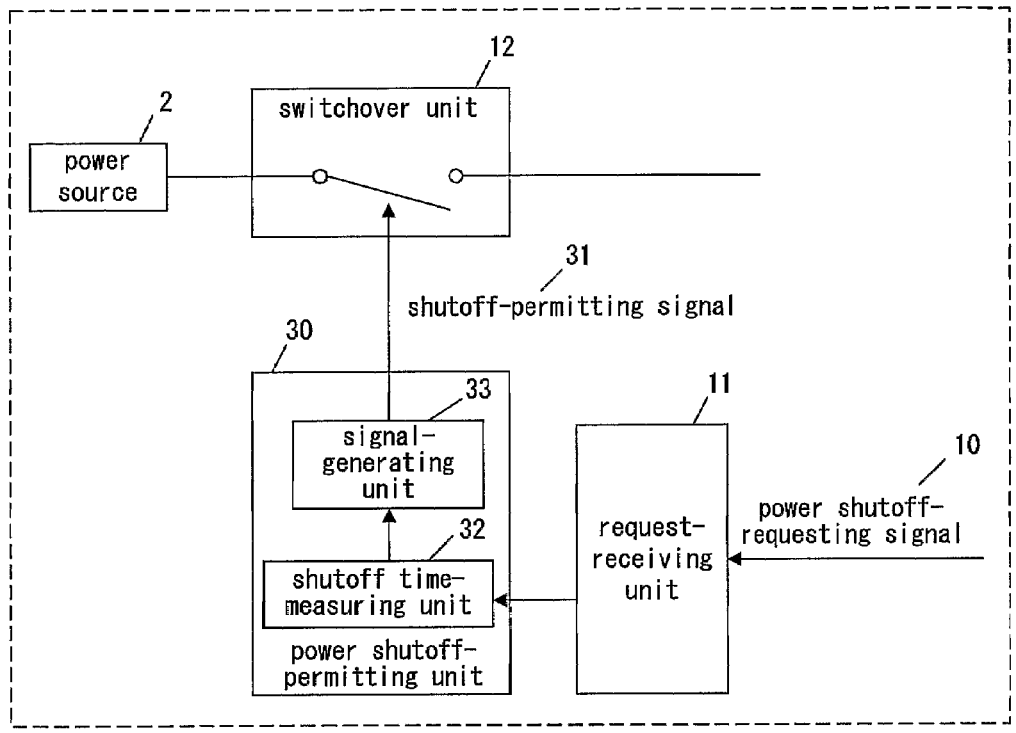
FIG. 10 is a block diagram illustrating the interior of one type of a power supply control circuit according to the second embodiment.

The following discusses, with reference to FIG. 10, a process in which the power shutoff is started when a certain period of time elapses after the receipt of the power shutoff-requesting signal 10.

FIG. 10 is a block diagram illustrating the interior of one type of a power supply control circuit according to the present embodiment. Referring to FIG. 10, the power shutoff-permitting unit 30 is shown including a shutoff time-measuring unit 32. When the power supply control circuit 3 receives the power shutoff-requesting signal 10 from each of the functional blocks, the shutoff time-measuring unit 32 is operable to start measuring the time, thereby measuring a predetermined time. When completing the measurement of the predetermined time, the shutoff time-measuring unit 32 feeds a notification signal into a signal-generating unit 33. The signal-generating unit 33 in receipt of the notification signal feeds a shutoff-permitting signal 31 into the switchover unit 12. The switchover unit 12 interrupts the power supply in response to the shutoff-permitting signal 31.

The power shutoff-permitting unit 30 including the shutoff time-measuring unit 32 gives permission for power shutoff when a certain time margin is ensured after the power supply control circuit 3 receives the power shutoff-requesting signal 10. The time margin ensures a certain period of time until actual power shutoff after the power shutoff-requesting signal 10 is sent out by each of the functional blocks, whereby each of the functional blocks is prevented from malfunctioning. Furthermore, the ensured certain period of time provides a period of time before a notification signal for an interruption in the power supply fed to the outside or otherwise to the processor. In addition, assuming that an internal or external interruption that requests another action is entered into the functional blocks immediately after the functional blocks send out the power shutoff-requesting signal 10, the power shutoff-requesting signal 10 can be waived during the ensured certain period of time before the power supply is shut off. Such a request withdrawal avoids the power shutoff, thereby promptly coping with the external request for another action.

As described above, the shutoff time-measuring unit 32 ensures a certain period of time until the power supply is shut off, thereby providing the high-usability power supply control circuit 3 designed for fine-tuned switchover between operative and inoperative modes.

Figure 11:
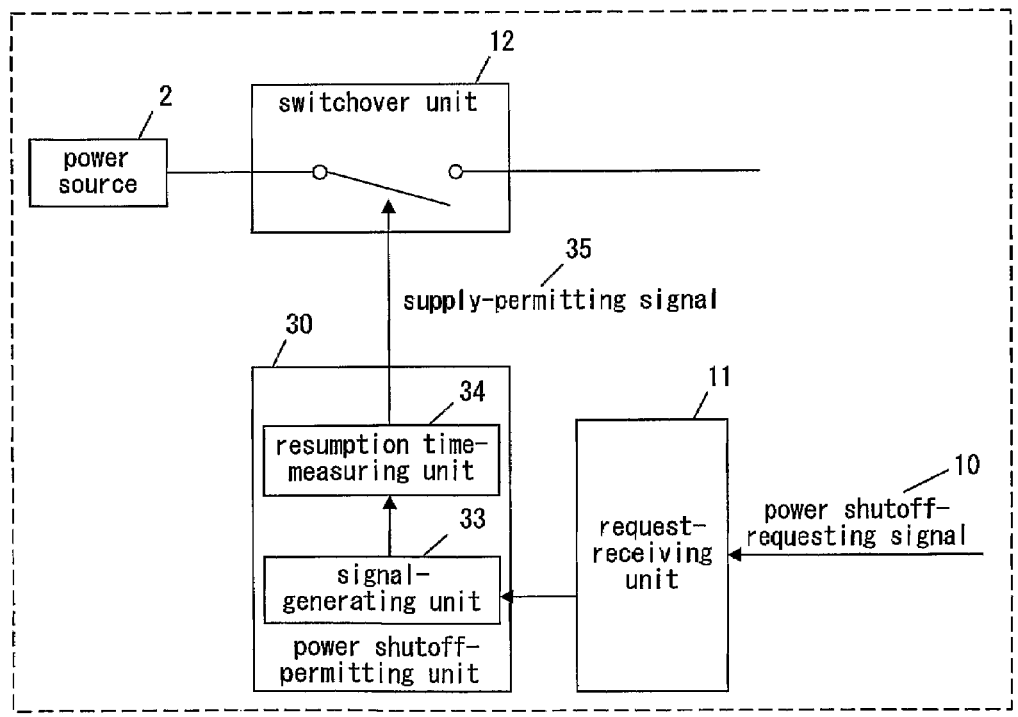
FIG. 11 is a block diagram illustrating the interior of another type of a power supply control circuit according to the second embodiment.

The following discusses, with reference to FIG. 11, a process in which the power supply control circuit 3 resumes the power supply when a certain period of time elapses after the power shutoff.

FIG. 11 is a block diagram illustrating the interior of another type of a power supply control circuit according to the present embodiment. Referring to FIG. 11, the power shutoff-permitting unit 30 is shown including a resumption time-measuring unit 34. The resumption time-measuring unit 34 is operable to start measuring the time upon receipt of a shutoff-permitting signal generated by the signal-generating unit 33 in accordance with the power shutoff-requesting signal 10, and is operable to feed a supply-permitting signal 35 into the switchover unit 12 after the elapse of a certain period of time. The switchover unit 12 in receipt of the supply-permitting signal 35 provides switchover from a power shutoff mode to a power supply mode, thereby resuming the supply of power to each of the functional blocks.

The resumed power supply after the measurement of a certain period of time by the resumption time-measuring unit 34 readily produces the timing to resume the power supply. In particular, time information on the certain period of time measured by the resumption time-measuring unit 34 is stored in either a rewritable register or a rewritable memory, whereby the time that elapses until the power supply is resumed can be changed in accordance with a change in specification. For the power shutoff-requesting signal 10 containing shutoff time information as illustrated in FIG. 3, the contained shutoff time information determines a certain period of time to be measured. As a result, it is possible to measure the resumption time properly met by a request from each of the functional blocks. Alternatively, the processor unit 4 may manage the setting of the resumption time.

As described above, the presence of the resumption time-measuring unit 34 automatically resumes the power supply when a certain period of time elapses after the power shutoff, whereby both of the power shutoff and the power supply are properly controlled, with the result that reduced power consumption is attained.

The certain period of time measured by the resumption time-measuring unit 34 may desirably be an estimated time that is required for an initial rise when the power supply is resumed.

Alternatively, both the shutoff time-measuring unit 32 of FIG. 10, operable to measure the margin time until actual power shutoff, and the resumption time-measuring unit 34 of FIG. 11 may be provided. The presence of the two different measuring units 32, 34 provides a high-usability power supply control circuit 3 operable to prevent the malfunction of each of the functional blocks, and operable to automatically resume the power supply.

As described above, the power supply control circuit 3 according to the present embodiment provides high-usability switchover between the power shutoff and the power supply in accordance with the power shutoff-requesting signal 10 from each of the functional blocks.

Third Embodiment

A third embodiment is now described with reference to FIGS. 12 and 13.

The present embodiment describes a system which can fix output values provided by signal lines extending among functional blocks during power shutoff.

Figure 12:
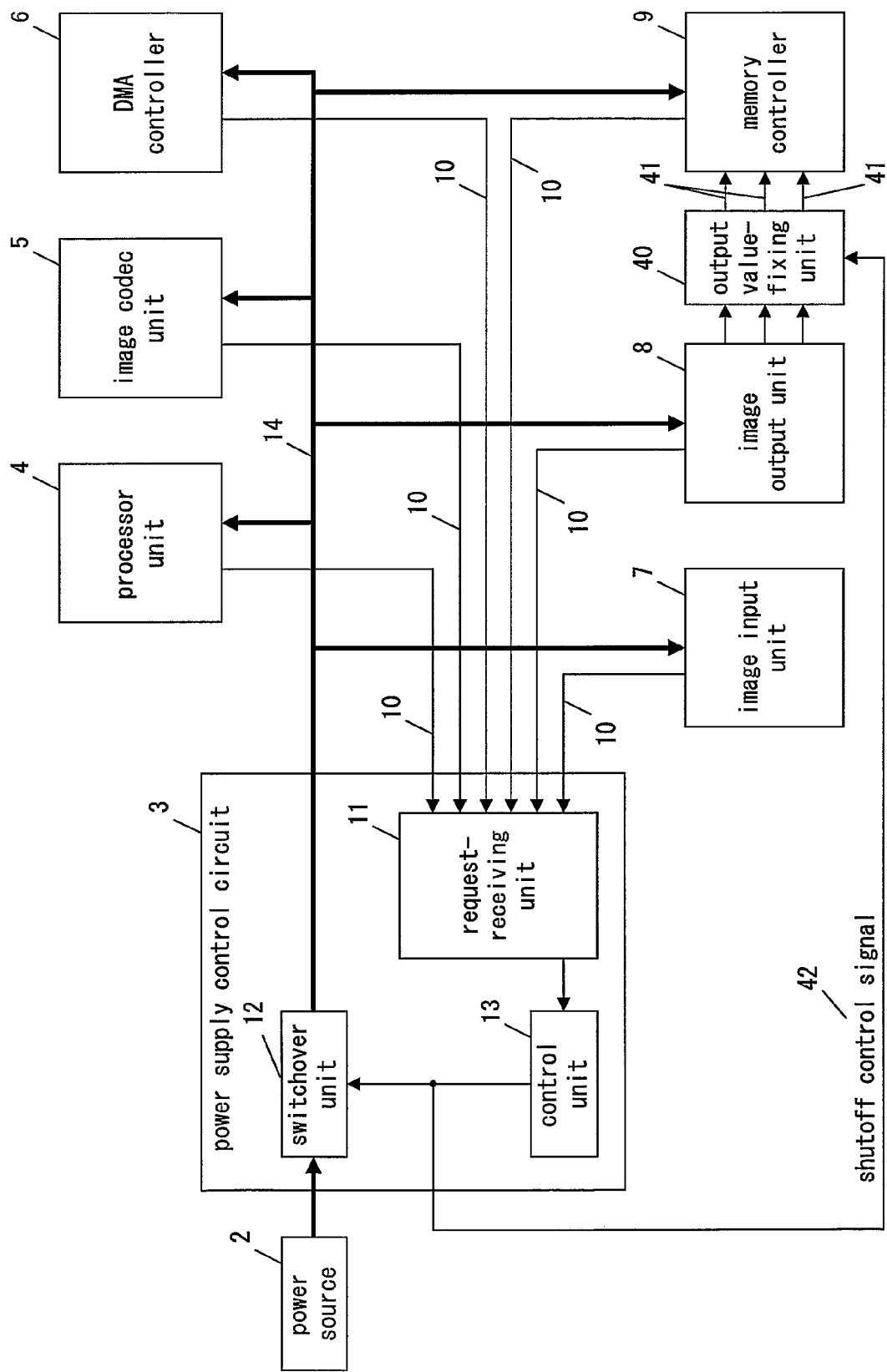
FIG. 12 is a block diagram illustrating an electronic circuit according to a third embodiment.

FIG. 12 is a block diagram illustrating an electronic circuit according to the present embodiment. FIG. 13 is a block diagram illustrating the interior of an output value-fixing unit according to the present embodiment.

When the electronic circuit includes a plurality of functional blocks, signals are sometimes exchanged among the functional blocks. Referring to FIG. 12, the signal lines 41 are shown formed between an image output unit 8 and a memory controller 9. For example, request and address signals are sent out from the image output unit 8 to the memory controller 9. The signal lines 41 are signal channels related to the request and address signals.

There are cases where the supply of the power to the image output unit 8 is interrupted in accordance with the power shutoff-requesting signal 10 from the image output unit 8. At this time, an output signal to the memory controller 9 through the signal lines 41 must properly be treated. When the supply of the power to the image output unit 8 is interrupted, then electrical voltage changes upon the power shutoff, thereby producing a likelihood that the value of each of the signal lines 41 is varied. The varied output value of each of the signal lines 41 enters the memory controller 9, and the memory controller 9 is likely to malfunction.

Furthermore, although the request signal to the memory controller 9 must be non-active when the image output unit 8 is rendered inoperative, the request signal is likely to remain fixed to an active mode because of power shutoff-caused variations in electrical power. This means that the memory controller 9 is maintained in constant receipt of a request from the image output unit 8 although the image output unit 8 is deactivated by power shutoff. Consequently, the memory controller 9 is inaccessible by the other functional blocks.

The output value-fixing unit 40 provides each of the signal lines 41 having an output value fixed to a degree at which no problem arises upon power shutoff. For example, the request and address signals are fixed to a non-active value and an initial value, respectively. The output value-fixing unit 40 provides the fixed output value in response to a shutoff control signal 42 from the control unit 13. The fixed output value prevents the malfunction of each of the functional blocks, which otherwise would occur after an interruption in the supply of the power to each of the functional blocks.

Figure 13:
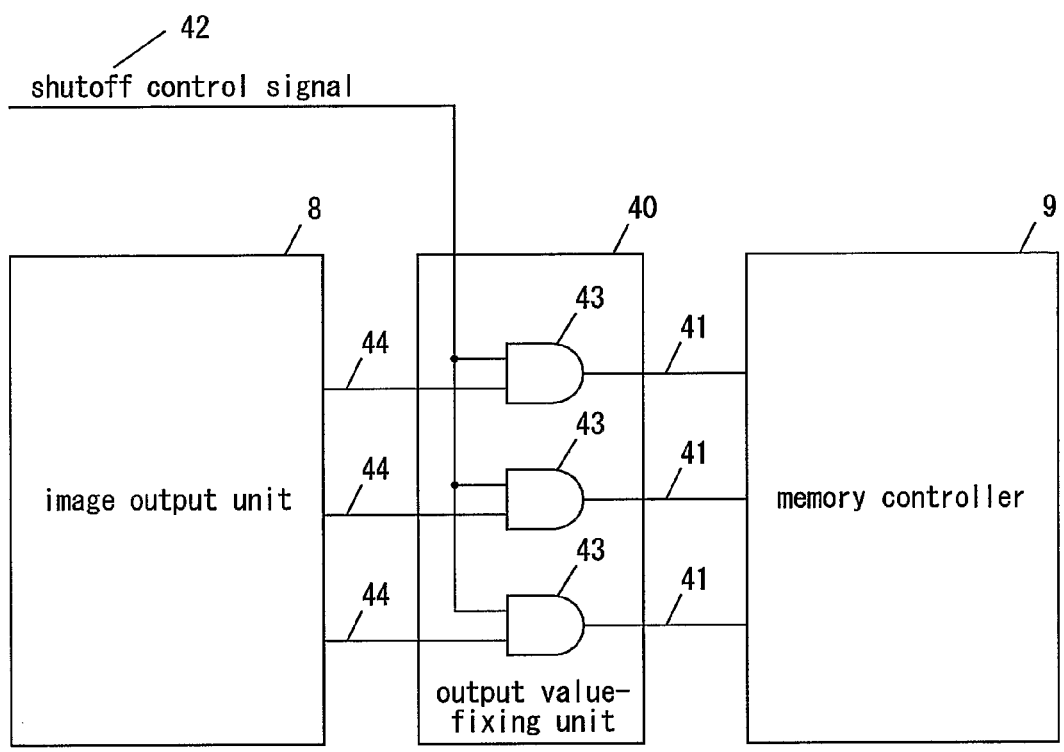
FIG. 13 is a block diagram illustrating the interior of an output value-fixing unit according to the third embodiment.

The output value-fixing unit 40 may be a circuit of FIG. 13. The circuit of FIG. 13 is offered merely as an illustration, and the output value-fixing unit 40 is not limited thereto. Each AND circuit 43 may be replaced by, e.g., a selector, a multiplexer, and a switching circuit.

The output value-fixing unit 40 includes the AND circuits 43. The shutoff control signal 42 and one of output signals 44 enter each of the AND circuits 43 as input, while one of the signal lines 41 leaves each of the AND circuits 43 as output. The shutoff control signal 42 has the value "1" during power supply, but has the value "0" during power shutoff. The shutoff control signal 42 entering each of the AND circuits 43 during power supply has the value "1", and a value of each of the output signals 44 from the image output unit 8 is fed directly into the memory controller 9 as a value of each of the signal lines 41. In contrast, the shutoff control signal 42 entering each of the AND circuits 43 during power shutoff has the value "0", and each of the signal lines 41 has the fixed value "0", regardless of each of the output signals 44 from the image output unit 8. As a result, no improper signal is sent out to the memory controller 9, and the memory controller 9 is prevented from malfunctioning.

The output value-fixing unit 40 of FIG. 13 provides each of the signal lines 41 with an output value fixed to the value "0" during power shutoff, and the request signal is desirably formed in such a manner that the request signal having the value "0" is non-active.

Instead of providing the fixed output values of all of the signal lines 41, it is also desirable, because of the advantage of a downsized circuit, that the output value-fixing unit 40 provides an fixed output value(s) of only suspicious one(s) of the signal lines 41, in which the suspicious signal line(s) 41 is (or are) likely to bring about a malfunction.

An increased number of the functional blocks as well as an increased number of the signal lines 41 extending among the functional blocks result in a larger-scaled circuit in the output value-fixing unit 40. Since the supply of power to the output value-fixing unit 40 cannot be interrupted, the larger-scaled circuit in the output value-fixing unit 40 brings about increased power consumption therein, which can be a problem. To smooth out the problem, it is desirable that at least one of the operating voltage and threshold voltage of each of the electronic elements (such as the AND circuits 43) included in the output value-fixing unit 40 is made lower than the operating voltage and threshold voltage, respectively, of each electronic element included in each of the other functional blocks.

As a result, an increase in the power consumption in the output value-fixing unit 40 is suppressible, which otherwise would occur with a greater number of the functional blocks and a greater number of the signal lines 41. It is also desirable that the output value-fixing unit 40 is used in conjunction with the power supply control circuit 3 according to the first and second embodiments because a higher level of power shutoff control is provided.

As described above, the presence of the output value-fixing unit 40 prevents the malfunction of each of the functional blocks during power shutoff.

The power supply control circuit 3 according to the first embodiment through the present embodiment may be formed by either discrete electronic elements or a semiconductor integrated circuit. The power supply control circuit 3 according to the first embodiment through the present embodiment may be either separated from the functional blocks or incorporated integrally into the same electronic circuit. The electronic circuit 1 including the power supply control circuit 3 and the functional blocks may be integrated into either a singular or plural semiconductor integrated circuits.

Fourth Embodiment

Figure 14:
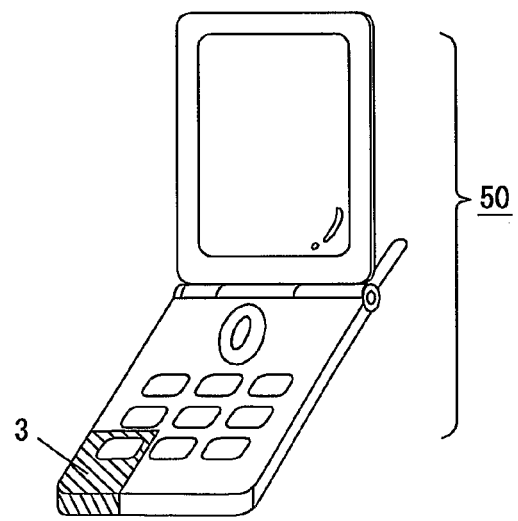
FIG. 14 is a perspective view illustrating a portable terminal according to a fourth embodiment.
Figure 15:
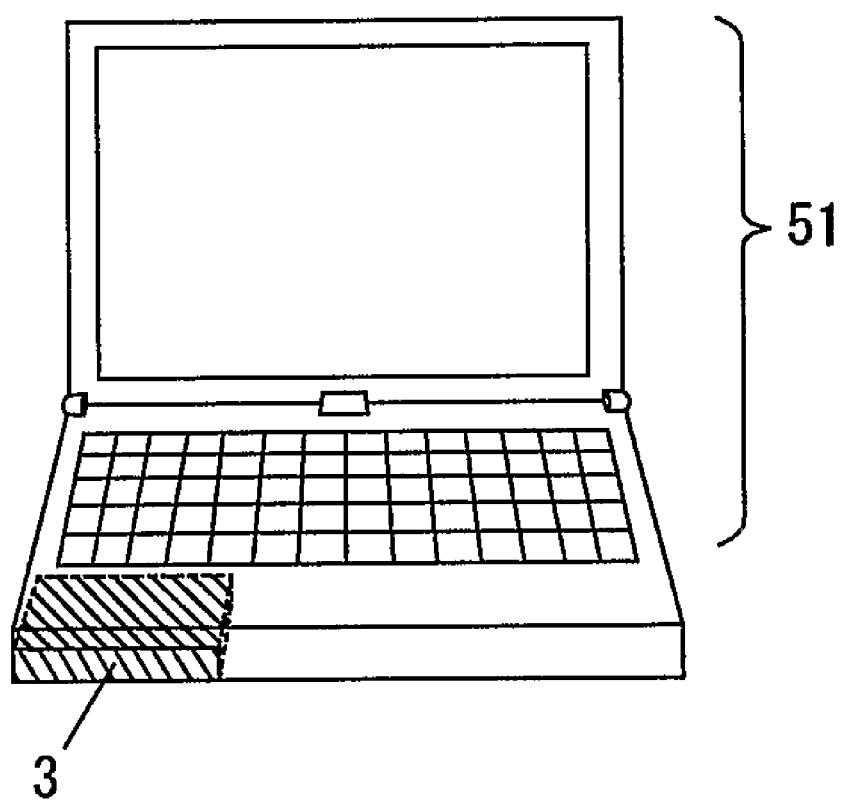
FIG. 15 is a perspective view illustrating a notebook-sized personal computer according to the fourth embodiment.
Figure 16:
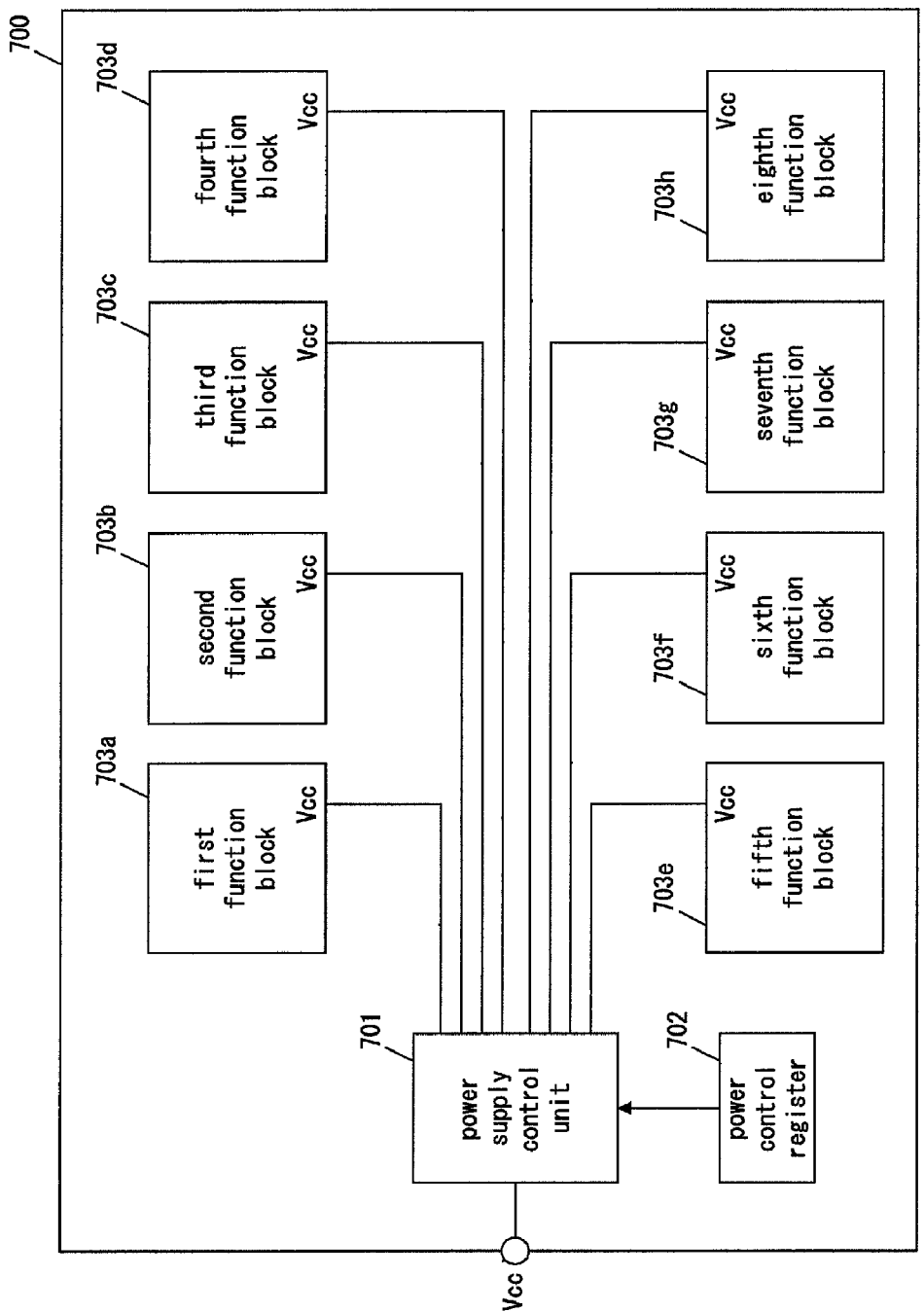
FIG. 16 is a block diagram illustrating a prior art electronic circuit.
Figure 17:
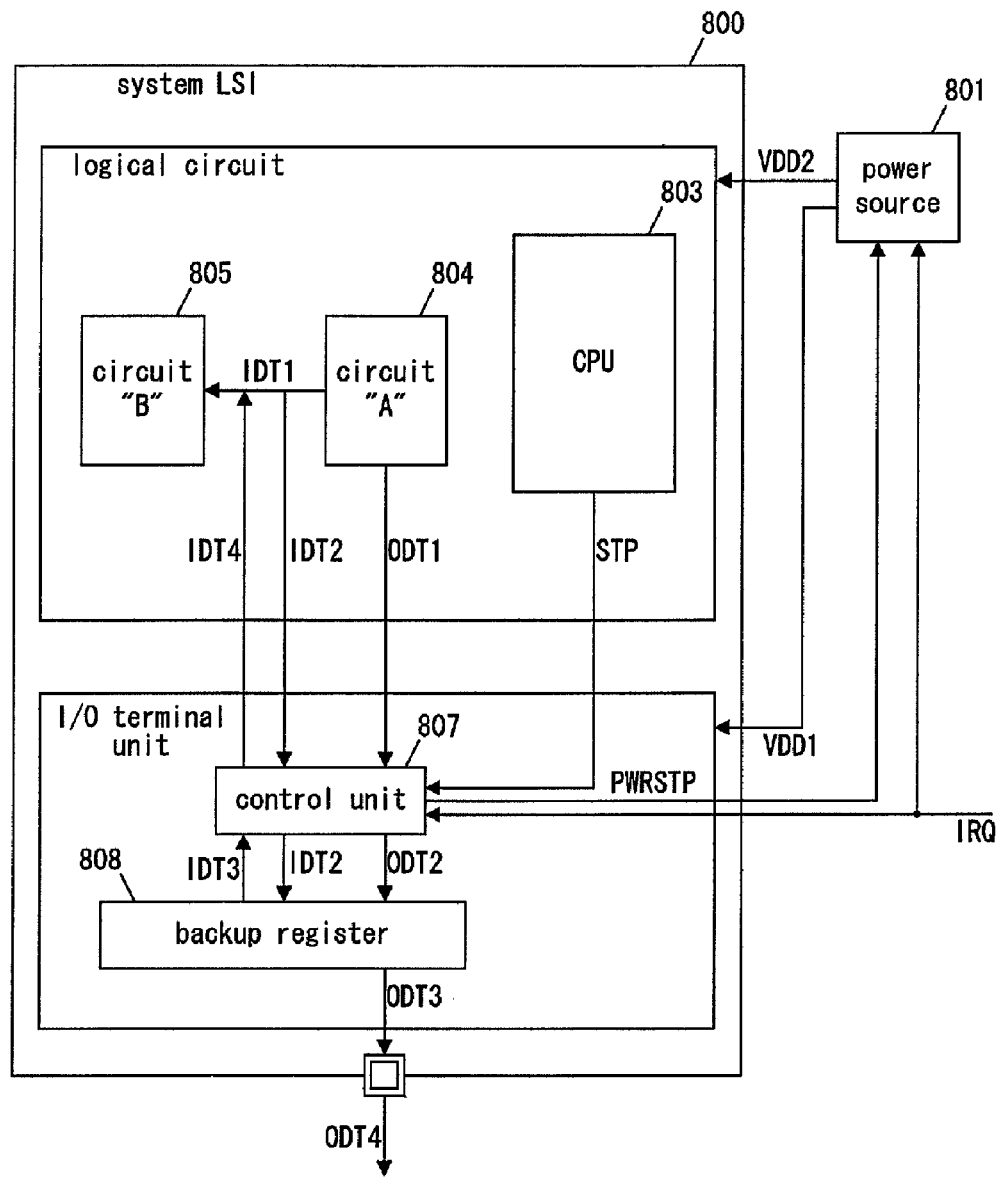
FIG. 17 is a block diagram illustrating a prior art system LSI.

FIG. 14 is a perspective view illustrating a portable terminal according to a fourth embodiment. FIG. 15 is a perspective view illustrating a notebook-sized personal computer according to the present embodiment.

The portable terminal 50 may be a handheld electronic terminal such as a cellular phone, a PDA, and an e-mail terminal. The portable terminal 50 includes the power supply control circuit 3 according to any of the first through third embodiments. The portable terminal 50 is provided with functions including telephone communication capability, an e-mail-receiving feature, an e-mail-sending feature, a character-editing feature, an image-capturing feature, and an image-reproducing feature. Each of the above features is provided as a functional block having a particular processing function. Each of such functional blocks is realized by either an electronic circuit or a semiconductor integrated circuit.

Although illustrated in neither FIG. 14 nor FIG. 15, each of the portable terminal 50 and the notebook-sized personal computer 51 includes a central processor, such as e.g., a central processing unit, having control of interior circuits and programs.

All of the above functions are not always operative. For example, while the telephone communication capability is active, the e-mail-sending feature is rendered inoperative. Thus, the supply of the electrical power to each of the functional blocks rendered inoperative is desirably interrupted, from the viewpoint of a reduction in power consumption. As described in the first to third embodiments, the power supply control circuit 3 is operable to interrupt the supply of the power to each of the functional blocks rendered inoperative, in response to a power shutoff-requesting signal from the functional block. As a result, when the telephone communication capability is active, the supply of the power to the functional blocks having features other than the telephone communication capability is interrupted, whereby dramatically reduced power consumption in the portable terminal 50 is achievable. With functional blocks having a mutually processing dependent relationship with each other, such as the character-editing and e-mail-sending features, the power supply control circuit 3 is, of course, operable to monitor a power shutoff-requesting signal from each of the above functional blocks, thereby determining whether the power shutoff is permissible.

Similarly, the notebook-sized personal computer 51 of FIG. 15 includes functional blocks operable to serve a plurality of functions. Thus, the functional blocks rendered operative and inoperative are present in the notebook-sized personal computer 51. Similarly, the power supply control circuit 3 interrupts the supply of the power to each of the functional blocks rendered inoperative, in response to the power shutoff-requesting signal 10 therefrom. The power shutoff provides reduced power consumption in the notebook-sized personal computer 51.

The portable terminal 50 and notebook-sized personal computer 51 are operated by a handheld power source such as a battery, and the reduced power consumption allows them to operate for an increased period of time.

Thus, the electronic device having the power supply control circuit 3 incorporated therein provides both reduced power consumption in the electronic device and a longer period of operating time of the electronic device.

The power supply control circuit according to the present invention allows the supply and shutoff of power to a plurality of functional blocks to be controlled for each of the functional blocks. In addition, the power supply control circuit according to the present invention provides control over the power shutoff in accordance with a power shutoff signal sent out by each of the functional blocks, and the occurrence of excess loads such as on external settings is eliminated.

The power supply control circuit according to the present invention uses, as the power shutoff-requesting signal 10, a processing end signal from each of the functional blocks, and easy and proper power shutoff is achievable.

When there is one functional block having a mutually processing dependent relationship with another functional block that has sent out a power shutoff-requesting signal 10, the power supply control circuit according to the present invention interrupts the power supply, in light of the power shutoff-requesting signal 10 from the former functional block having the mutually processing dependent relationship with the latter functional block as well as the power shutoff-requesting signal 10 from the latter functional block. As a result, mutually dependent processing is achievable without being impeded.

The power supply control circuit according to the present invention provides a fixed output value of each of the functional blocks to which the supply of power is interrupted, and each of the other functional blocks in receipt of the fixed output value is prevented from malfunctioning.

As may be understood from the above, the power supply control circuit according to the present invention provides power shutoff in accordance with the power shutoff-requesting signal from each of the functional blocks without allowing influences to be exercised on a course of action provided by the entire electronic circuit, and without allowing each of the functional blocks to malfunction, whereby the electronic circuit consumes reduced electrical power. As a result, each electronic device can be operated for a longer period of time when being formed with the electronic circuit including the power supply control circuit according to the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The present invention finds preferred applications in the field of, e.g., a power supply control circuit integrated in a semiconductor integrated circuit including a plurality of functional blocks, in which the power supply control circuit has proper and easy control of the power supply, whereby the semiconductor integrated circuit consumes reduced electrical power.

The invention claimed is:

1. A power supply control circuit for controlling supply and shutoff of electrical power from a power source to a plurality of functional blocks, each of the plurality of functional blocks having a predetermined processing function, said power supply control circuit comprising:

a request-receiving unit operable to receive a power shutoff-requesting signal from each of the plurality of functional blocks;

a switchover unit operable to provide switchover between the supply and shutoff of the electrical power from the power source to each of the plurality of functional blocks; and a control unit operable to control said switchover unit in accordance with the power shutoff-requesting signal received from each of the plurality of functional blocks by said request-receiving unit, said control unit comprising a power shutoff-permitting unit operable to permit a start and an end of the shutoff of the electrical power in accordance with the power shutoff-requesting signal received from each of the plurality of functional blocks by said request-receiving unit, wherein said power shutoff-permitting unit permits the start of the shutoff of the electrical power to a first one of the plurality of functional blocks in accordance with the power shutoff-requesting signal from the first one of the plurality of functional blocks and the power shutoff-requesting signal from a second one of the plurality of functional blocks, the second one of the plurality of functional blocks having a processing dependent relationship with the first one of the plurality of functional blocks.

2. A power supply control circuit as defined in claim 1, wherein the power shutoff-requesting signal sent out by at least one of the plurality of functional blocks is a processing end signal.

3. A power supply control circuit as defined in claim 1, wherein the power shutoff-requesting signal sent out by at least one of the plurality of functional blocks is a notification signal sent out at definite time intervals.

4. A power supply control circuit as defined in claim 1, wherein the power shutoff-requesting signal from each of the plurality of functional blocks contains information on a period of time that elapses from the shutoff of the electrical power until a resupply of the electrical power.

5. A power supply control circuit as defined in claim 1, wherein said power shutoff-permitting unit permits the end of the shutoff of the electrical power to the first one of the plurality of functional blocks in accordance with the power shutoff-requesting signal from the first one of the plurality of functional blocks and the power shutoff-requesting signal from the second one of the plurality of functional blocks.

6. A power supply control circuit as defined in claim 1, wherein two or more functional blocks of the plurality of functional blocks have a processing dependent relationship with the first one of the plurality of functional blocks,
wherein the two or more functional blocks of the plurality of functional blocks include the second one of the plurality of functional blocks, and
wherein said power shutoff-permitting unit permits the start of the shutoff of the electrical power to the first one of the plurality of functional blocks in accordance with the power shutoff-requesting signal from the first one of the plurality of functional blocks and the power shutoff-requesting signal from each of the two or more functional blocks.

7. A power supply control circuit as defined in claim 1, wherein said power shutoff-permitting unit comprises an information-storing unit operable to store information on the processing dependent relationship.

8. A power supply control circuit as defined in claim 7, wherein said information-storing unit is rewritable in accordance with an external factor.

9. A power supply control circuit as defined in claim 1, wherein said power shutoff-permitting unit comprises a shutoff time-measuring unit operable to measure a certain period of time that elapses after receipt of the power shutoff-requesting signal, and
wherein said power shutoff-permitting unit permits the start of the shutoff of the electrical power to the first one of the plurality of functional blocks after the certain period of time elapses.

10. A power supply control circuit as defined in claim 1, wherein said power shutoff-permitting unit comprises a resumption time-measuring unit operable to measure a certain period of time that elapses after the start of the shutoff of the electrical power to the first one of the plurality of functional blocks, and
wherein said power shutoff-permitting unit permits the end of the shutoff of the electrical power to the first one of the plurality of functional blocks after the certain period of time elapses.

11. An electronic circuit comprising:
a plurality of functional blocks, each of said plurality of functional blocks having a predetermined processing function;
a request-receiving unit operable to receive a power shutoff-requesting signal from each of said plurality of functional blocks;
a switchover unit operable to provide switchover between supply and shutoff of electrical power from a power source to each of said plurality of functional blocks; and
a control unit operable to control said switchover unit in accordance with the power shutoff-requesting signal received from each of said plurality of functional blocks by said request-receiving unit, said control unit comprising
a power shutoff-permitting unit operable to permit a start and an end of the shutoff of the electrical power in accordance with the power shutoff-requesting signal received from each of said plurality of functional blocks by said request-receiving unit,
wherein said power shutoff-permitting unit permits the start of the shutoff of the electrical power to a first one of said plurality of functional blocks in accordance with the power shutoff-requesting signal from said first one of said plurality of functional blocks and the power shutoff-requesting signal from a second one of said plurality of functional blocks, said second one of said plurality of functional blocks having a processing dependent relationship with said first one of said plurality of functional blocks.

12. An electronic circuit as defined in claim 11, further comprising
an output value-fixing unit operable to fix a logical value of an output signal from at least one functional block of said plurality of functional blocks,
wherein said output value-fixing unit provides a fixed logical value of the output signal from said at least one functional block of said plurality of functional blocks when the supply of the electrical power to said at least one functional block is interrupted.

13. An electronic circuit defined in claim 12,
wherein each of said plurality of functional blocks includes an electronic element having an operating voltage,
wherein said output value-fixing unit includes an electronic element having an operating voltage, and
wherein said operating voltage of said electronic element included in said output value-fixing unit is lower than said operating voltage of said electronic element included in each of said plurality of functional blocks.

14. An electronic circuit defined in claim 12,
wherein each of said plurality of functional blocks includes an electronic element having a threshold voltage,
wherein said output value-fixing unit includes an electronic element having a threshold voltage, and
wherein said threshold voltage of said electronic element included in said output value-fixing unit is lower than said threshold voltage of said electronic element included in each of said plurality of functional blocks.

15. An electronic device comprising:
a plurality of functional blocks, each of said plurality of functional blocks having a predetermined processing function;
a request-receiving unit operable to receive a power shutoff-requesting signal from each of said plurality of functional blocks;
a switchover unit operable to provide switchover between supply and shutoff of electrical power from a power source to each of said plurality of functional blocks;
a control unit operable to control said switchover unit in accordance with the power shutoff-requesting signal received from each of the plurality of functional blocks by said request-receiving unit, said control unit comprising a power shutoff-permitting unit operable to permit a start and an end of the shutoff of the electrical power in accordance with the power shutoff-requesting signal received from each of said plurality of functional blocks by said request-receiving unit, wherein said power shutoff-permitting unit permits the start of the shutoff of the electrical power to a first one of the plurality of functional blocks in accordance with the power shutoff-requesting signal from said first one of said plurality of functional blocks and the power shutoff-requesting signal from a second one of said plurality of functional blocks, said second one of said plurality of functional blocks having a processing dependent relationship with said first one of said plurality of functional blocks; and a central processing unit operable to control the predetermined processing function of each of said plurality of functional blocks.

16. An electronic device as defined in claim 15, wherein said electronic device is a portable terminal.

17. An electronic device as defined in claim 15, wherein said electronic device is a notebook-sized personal computer.

* * * * *